United States Patent [19]

Wollenschläger

[11] 4,450,500
[45] May 22, 1984

[54] ELECTRIC CAPACITOR OF VARIABLE CAPACITANCE

[75] Inventor: Werner Wollenschläger, Marktredwitz, Fed. Rep. of Germany

[73] Assignee: Draloric Electronic GmbH, Fed. Rep. of Germany

[21] Appl. No.: 498,244

[22] Filed: May 26, 1983

[30] Foreign Application Priority Data

Dec. 9, 1982 [DE] Fed. Rep. of Germany ....... 3245523

[51] Int. Cl.³ .......................... H01G 5/00; H01G 4/04
[52] U.S. Cl. ...................................... 361/277; 361/327
[58] Field of Search ................ 361/277, 287, 327, 330

[56] References Cited

U.S. PATENT DOCUMENTS

| | | | |
|---|---|---|---|
| 1,898,770 | 2/1933 | Gomery | 361/327 X |
| 2,867,757 | 1/1959 | Wagner | 361/327 X |

FOREIGN PATENT DOCUMENTS

769649 10/1980 U.S.S.R. .............................. 361/327

Primary Examiner—Donald A. Griffin

[57] ABSTRACT

An electric capacitor of variable capacitance, including a dielectric body comprised of densely sintered ceramic material, including a hollow space extending longitudinally through the tubular ceramic body for containing dielectric liquid. First and second dielectric liquids of different dielectric constants and densities are contained in the hollow space, and an adjusting cylinder connected to the hollow space adjusts the height levels of the two dielectric liquids in the hollow space for adjusting the capacitance of the capacitor. The hollow space is either longitudinal channels through the tubular body or is a radial space between two concentric tubular bodies which together define the dielectric body. The metal layers of the capacitor plates are respectively on the inside and the outside of the dielectric body.

23 Claims, 1 Drawing Figure

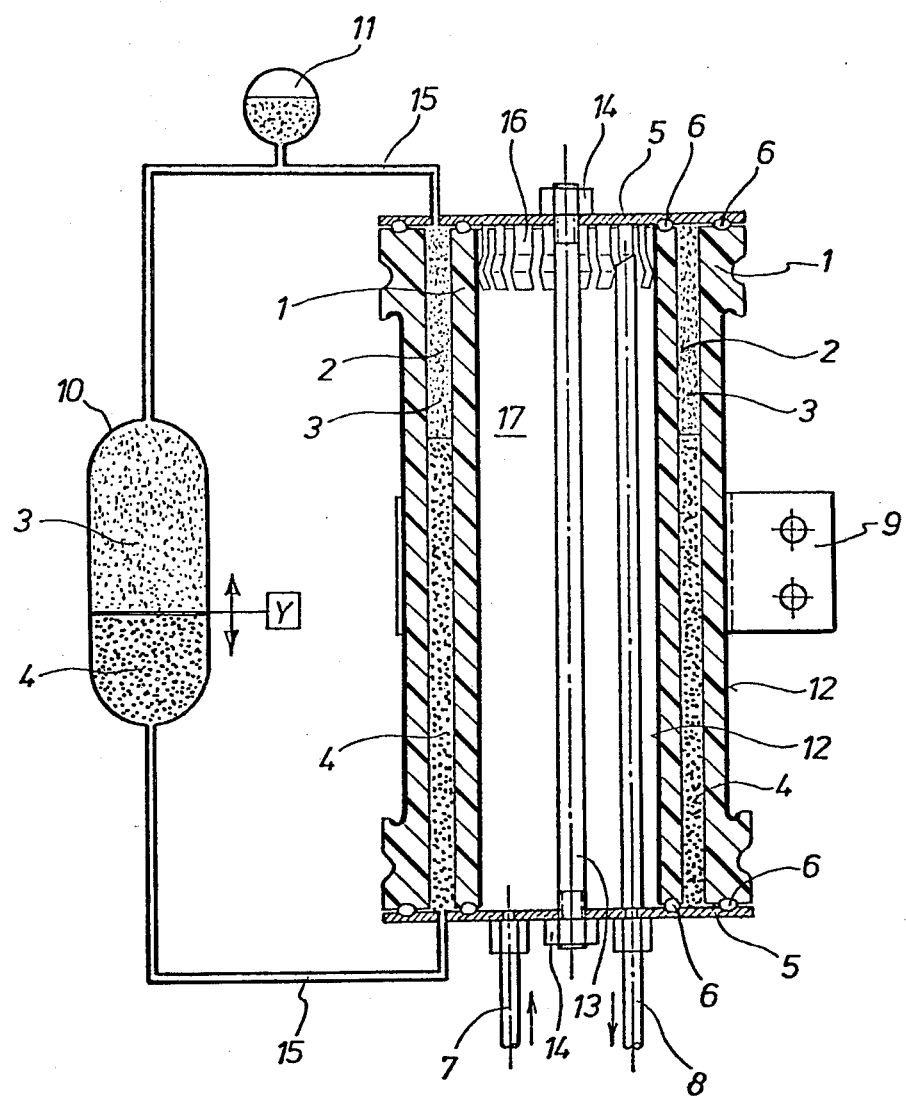

ELECTRIC CAPACITOR OF VARIABLE CAPACITANCE

BACKGROUND OF THE INVENTION

The present invention relates to an electrical capacitor of variable capacitance, and particularly to such a capacitor which uses liquid dielectrics to establish the varying capacitance. In particular, the invention relates to such a capacitor wherein the body of dielectric material of the capacitor is comprised of a densely sintered ceramic material.

One variable capacitance capacitor is known from German Provisional Patent De-AS No. 11 05 519. However, its two capacitor plates are self-supporting capacitor plates which are rigidly connected to each other. The space between the rigidly connected capacitor plates is filled up to a variable height by a first liquid dielectric of high dielectric constant. Above this first liquid dielectric there is a second liquid dielectric of lower density and lower dielectric constant. The capacitor plates can be provided with an insulating coating, for instance an insulating varnish, in order to increase the breakdown strength. To serve as the liquid dielectric of high dielectric constant, use is made, for instance, of oil, glycerine, distilled water or else a mixture of distilled water and glycerine or chlorine derivatives of benzene and diphenyl, for instance chlophene. To serve as the liquid dielectric of lower density and smaller dielectric constant, a light oil can be used. The capacitor plates are arranged in a container. No detailed information is given in this patent as to the construction of the arrangement.

Also known is a liquid-cooled, variable vacuum capacitor with stationary electrodes, which are movable at one end within a vacuum-tight housing with movable electrodes which are interleaved with the stationary electrodes and which electrodes are movable by mechanical means in the axial direction with respect to the stationary electrodes. This is known from German Application for Patent DE-OS No. 20 63 885. This variable vacuum capacitor and the capacitor known, for instance, from German Application DE-OS No. 22 59 351 are constructed in mechanically expensive fashion from a large number of parts, making these vacuum capacitors relatively expensive. Furthermore, their mechanical parts are subject to wear upon repeated adjustments of their capacitance. The period of use of vacuum capacitors in operation is also limited by the fact that the vacuum and thus the dielectric strength drops after a longer period of time, which can lead in the extreme case to the failure of the capacitor.

German Application DE-OS No. 22 39 220 discloses a variable capacitor consisting of a dielectric cylinder on which an electrically conductive layer is arranged on a part of its outer cylindrical surface. That layer forms a first capacitor plate. A ram which is arranged for axial movement within the dielectric cylinder forms the second capacitor plate. This known capacitor has chambers which are filled with a liquid dielectric.

German Utility Mode DE-GM No. 17 26 891 discloses a ceramic capacitor with liquid cooling, particularly for high-frequency industrial generators. At least the part of the ceramic dielectric is covered by the metal layers of the plates. The dielectric may also have a tubular development, and it forms or it has a hollow space to receive the cooling liquid. Cooling liquids suggested in general are water, oils, cooling brines or other non-conductive liquids. However, there is no indication of two different, non-intermixing dielectric liquids and thus no suggestion as to the development of a capacitor of variable capacitance.

SUMMARY OF THE INVENTION AND BRIEF DESCRIPTION OF THE DRAWING

The object of the present invention is to provide an electrical capacitor of variable capacitance of the aforementioned type which is of simple construction and is of substantially lower price than known vacuum capacitors.

This object is achieved in accordance with the invention. The capacitor includes a dielectric body which is comprised of densely sintered ceramic material. The ceramic body is shaped to have a hollow space through it for holding liquid dielectric material. The capacitor plates are in the form of metal layers on surfaces of the dielectric body, and the plates are separated by the hollow space. A first liquid dielectric material of a higher dielectric constant is present in the hollow space up to a height therein which is variable. Above the first liquid is a second liquid of dielectric material of a relatively lower dielectric constant and of lesser density. Pipes leading to the hollow space deliver the first and second liquids. An adjusting cylinder with a movable separating piston in it defines separate chambers for holding the two different liquids and the movement of the separating piston determines the height of the higher density liquid and thus the separating line between the higher and lower density liquids in the hollow space. The pipe for the lower density liquid may include an expansion chamber located at the highest portion of that pipe.

In a preferred form of the capacitor, the dielectric body is tubular in shape, and the metal layers of the capacitor plates are respectively on the outside and the inside of the tubular dielectric body. In one version, the hollow space comprises an annular array of longitudinally extending hollow channels through the body. In a preferred embodiment, the dielectric body is comprised of two tubes, one inside the other, and preferably eccentric, with the outer dimension of the inner tube and the inner dimension of the outer tube being selected that the hollow space is defined between the outside of the inner tube and the inside of the outer tube. End plates close off the opposite ends of the tubular dielectric body. These end plates may be sealed to seal off the hollow space through sealing rings. The hollow open area inside the inner tubular body is also sealed off by the end plates. That area may be filled with cooling liquid. Connections to the hollow space and to the interior space inside the inner tubular body pass through the metal plates.

Other features of the capacitor of the invention are detailed further below.

The advantages of the invention consist, in particular, in the simple construction of the high frequency power capacitors of variable capacitance in which no mechanically moving parts are present. In this way mechanical wear, which occurs in known vacuum capacitors, is avoided. Other advantages are that the dielectric body for the capacitor can be produced in very simple fashion, that the individual parts can be very easily assembled, and that relatively large rated capacitances with high rated voltages and power losses are possible.

The drawing is an elevational cross-sectional view of one embodiment of the invention.

DESCRIPTION OF A PREFERRED EMBODIMENT

The capacitor comprises a body of a ceramic dielectric 1. This comprises a single tubular molding, with hollow spaces 2 extending through it in the form of an annular array of longitudinal channels. Alternatively, the dielectric body 1 is preferably comprised of two ceramic, densely sintered, concentrically arranged, tubular cylinders which are radially separated from each other. The inner cylinder is completely covered on its inner cylindrical surface with a metal layer of the one plate 12 of the capacitor. The outer surface of the outer cylindrical surface is covered with a metal layer of the second capacitor plate 12 up to the anti-corona collars forming the end closure of the capacitor. The two tubular cylinders of which the ceramic dielectric 1 is comprised are dimensioned such that an annular hollow space is produced between the outer cylindrical surface of the inner tubular cylinder and the inner cylindrical surface of the outer tubular cylinder when the two tubular cylinders are arranged concentrically and are clamped tight and fast between the opposite end metal plates 5.

Sealing for the two dielectric liquids 3 and 4, which completely fill the hollow space 2, and sealing of the cooling liquid, which completely fills the central hollow space 17, are effected by sealing rings 6 which are pressed together with the metal plates 5 tightly against the end surfaces of the dielectric 1. The pressing of the metal plates is effected by threaded nuts 14 which can be screwed onto both ends of a threaded bolt 13, which protrudes through the central hollow space 17 of the dielectric 1 and beyond the metal plates 5.

The metal layer on the inner cylindrical surface of the dielectric 1, which forms the one plate 12 of the capacitor and which is in contact with the cooling liquid in space 17 can be covered with a protective glaze in order to protect against corrosion or removal of material, up to the region in which the contact blades 16 connected with the upper metal plate 5 are in contact with the metal layer 12. This inner metal layer forms the capacitor plate 12 which lies at ground potential.

A metallic clamp 9 with connection lug is electrically connected with the metal layer of the outer capacitor plate 12.

The lower metal plate 5 has two nipples 7 and 8 for the entrance and discharge of the cooling liquid in the space 17. Pipelines 15 for the two liquid dielectrics 3 and 4 are connected through the metal plates 5 to the hollow space 2 and are also connected to an adjusting cylinder 10 having a separating piston. The separation zone of the two non-intermixing liquid dielectrics 3 and 4 within the hollow space 2 in the ceramic dielectric 1 may be varied by a setting member Y by the separating piston which separates the two liquid dielectrics 3 and 4 of different dielectric constant from each other. By displacing the height of the separaton zone of the two liquid dielectrics 3 and 4 within the hollow space 2 of the ceramic dielectric 1, the resultant dielectric constant and thus the capacitance of the capacitor are changed.

At the highest point of the pipeline 15, there is an expansion vessel 11 for the dielectric liquid 3 of lower density and smaller dielectric constant.

The invention is not limited to the form of a cylindrical, tubular capacitor shown in this embodiment. It can be used in exactly the same way for pot-shaped or vertical plate-shaped capacitors.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. An electric capacitor of variable capacitance, comprising:
   a dielectric body comprised of densely sintered ceramic material; the body having a hollow space extending through it for holding liquid dielectric therein; the body having spaced apart surfaces generally at opposite sides of the hollow space;
   capacitor plates in the form of metal layers on the spaced apart surfaces of the body, and the plates being separated by the hollow space for defining the capacitor plates; the capacitor plates both having a respective height dimension;
   a first liquid dielectric material of relatively higher dielectric constant present up to a variable height in the hollow space, and the variable height being in the electric field of the capacitor; and
   a second liquid dielectric material of relatively lower dielectric constant and of lesser density than the first liquid located in the hollow space above the first liquid.

2. The capacitor of claim 1, wherein the plates are arranged a fixed distance apart.

3. The capacitor of claim 1, wherein the dielectric body is tubular in shape, and the spaced apart surfaces thereof are respectively radially inward and radially outward of the dielectric body.

4. The capacitor of claim 3, wherein the hollow space extends longitudinally through the body.

5. The capacitor of claim 4, wherein the hollow space comprises a plurality of longitudinal channels arrayed annularly around the tubular body.

6. The capacitor of claim 4, wherein the body is comprised of two tubular dielectric bodies, one inside the other, and the bodies are out of contact with each other, wherein the inner body has an outside diameter, and the outer body has an inside diameter, and the outside diameter of the inner body is less than the inside diameter of the outer body, for producing the hollow space between the inner and the outer bodies.

7. The capacitor of claim 6, wherein the tubular dielectric bodies are concentric.

8. The capacitor of claim 6, wherein the two tubular bodies are of the same dielectric constant.

9. The capacitor of claim 6, wherein the two tubular bodies are of different respective dielectric constants.

10. The capacitor of claim 6, further comprising anti-corona collars located at the longitudinal ends of and outside of the outer dielectric body.

11. The capacitor of claim 10, wherein the metal layer of one of the capacitor plates completely covers the inner surface of the inner tubular body, and the metal layer of the other capacitor plate completely covers the outer surface of the outer tubular body up to and not past the anti-corona collars thereof.

12. The capacitor of claim 6, further comprising a metallic clamp electrically in contact with the metal layer of the capacitor plate outside the outer tubular body.

13. The capacitor of claim 6, wherein the tubular bodies have opposite longitudinal ends; metal plates at the opposite ends of the tubular bodies for closing off the longitudinal ends of the tubular bodies.

14. The capacitor of claim 13, further comprising a bolt extending longitudinally through the tubular bodies to the metal plates, and the metal plates being clamped to the bolt.

15. The capacitor of claim 13, further comprising pipe connections through the plates and into the hollow space for the first and second liquid dielectrics.

16. The capacitor of claim 15, further comprising nipples through at least one of the metal plates at the inside of the inner tubular body for the entry and the discharge of a cooling liquid inside the inner tubular body.

17. The capacitor of claim 15, wherein the metal plates seal off the hollow space and also seal off a space defined inside the inner tubular body.

18. The capacitor of claim 17, further comprising sealing rings at the metal plates for sealing off the hollow space and the space defined inside the inner tubular body.

19. The capacitor of claim 17, further comprising spring contact blades on at least one of the metal plates for contacting the metal layer of the capacitor plate on the inner body.

20. The capacitor of claim 6, wherein the tubular bodies have opposite longitudinal ends; pipe connections into the hollow space for the first and second liquid dielectrics.

21. The capacitor of claim 20, further comprising an adjusting cylinder having a movable separating piston within the cylinder for defining separate chambers in the cylinder for the first and second liquid dielectrics, respectively, in the adjusting cylinder; a respective pipe connected to the hollow space from each of the chambers of the adjusting cylinder, such that movement of the separating piston adjusts the height of the zone of separation of the first and second liquids in the hollow space.

22. The capacitor of claim 21, wherein the pipe for the first liquid is connected to the bottom portion of the hollow space and the pipe for the second liquid is connected to the top portion of the hollow space.

23. The capacitor of claim 21, further comprising the pipe for the second liquid having in it an expansion vessel which is located at the highest part of that pipe.

* * * * *